United States Patent [19]

Montag

[11] Patent Number: 4,845,070

[45] Date of Patent: Jul. 4, 1989

[54] CATALYST FOR PRODUCING ALPHA, BETA-ETHYLENICALLY UNSATURATED ALIPHATIC MONOCARBOXYLIC ACID AND METHOD OF MAKING SAID CATALYST

[75] Inventor: Ruth A. Montag, Naperville, Ill.

[73] Assignee: Amoco Corporation, Chicago, Ill.

[21] Appl. No.: 891,766

[22] Filed: Jul. 31, 1986

Related U.S. Application Data

[60] Continuation-in-part of Ser. No. 785,325, Oct. 7, 1985, Pat. No. 4,631,264, which is a division of Ser. No. 946,986, Dec. 29, 1986, said Ser. No. 785,325, is a division of Ser. No. 632,018, Jul. 18, 1984, abandoned, which is a continuation of Ser. No. 412,914, Aug. 30, 1982, abandoned, said Ser. No. 946,984, is a continuation of Ser. No. 632,018, Jul. 18, 1984, abandoned, which is a continuation of Ser. No. 412,914, Aug. 30, 1982, abandoned.

[51] Int. Cl.$^4$ .......................... B01J 21/08; B01J 23/02
[52] U.S. Cl. ..................................... 502/243; 502/237
[58] Field of Search ................ 502/202, 234, 243, 237

[56] References Cited

U.S. PATENT DOCUMENTS

| | | | |
|---|---|---|---|
| 3,089,901 | 5/1963 | Vitcha et al. | 502/202 |
| 3,100,795 | 8/1963 | Frantz et al. | 502/243 |
| 3,325,554 | 6/1967 | Addy | 502/224 |
| 3,840,587 | 10/1974 | Pearson | 502/243 |
| 3,933,888 | 1/1976 | Schlaefer | 502/168 |

FOREIGN PATENT DOCUMENTS

8600299 1/1986 World Int. Prop. O. .......... 502/243

Primary Examiner—Carl F. Dees
Attorney, Agent, or Firm—William H. Magidson; Ralph C. Medhurst

[57] ABSTRACT

A particulate catalyst, especially suitable for condensation of an alpha, beta-ethylenically unsaturated monocarboxylic acid with formaldehyde, is disclosed. The catalyst comprises a catalyst support constituted by porous silica gel, and cesium ions in the +1 oxidation state on the catalyst support surface. The catalyst support has a surface area of about 50 to about 150 m$^2$/gram, a porosity of less than about 1 cm$^3$/gram, and a pore-size distribution such that less than about 10 percent of the pores present in the catalyst have a pore diameter greater than about 750 Angstroms. The cesium ions are present in an amount of about 4 to about 10 percent by weight, based on the weight of the catalyst. Also disclosed are methods of making the catalyst. One method contemplates combining, with agitation, a silica sol and a cesium compound able to provide cesium in the +1 oxidation state on the catalyst support surface. The silica sol has a silica particle diameter of about 50 to about 200 Angstroms. The silica sol and the cesium compound are combined in relative amounts sufficient to produce a freely-flowing slurry having a Cs/(SiO$_2$+Cs) weight ratio of about 0.04 to about 0.1. The freely-flowing slurry is solidified to a gel which is then dried to a crushable solid state. The dried gel is calcined for a time period sufficient to remove primarily adsorbed moisture therefrom.

9 Claims, 2 Drawing Sheets

FIG-2

CATALYST FOR PRODUCING ALPHA, BETA-ETHYLENICALLY UNSATURATED ALIPHATIC MONOCARBOXYLIC ACID AND METHOD OF MAKING SAID CATALYST

This case is a Continuation-in-Part of application Serial No. 785,325, filed Oct. 7, 1985 and now U.S. Pat. No. 4,631,264, which application is a Division of application Serial No. 632,018, filed July 18, 1984 and now abandoned, which application is a Continuation of Serial No. 412,914, filed Aug. 30, 1982 and now abandoned. This case is also a Continuation-in-Part of application Serial No. 946,986, filed Dec. 29, 1986, which is a Continuation of application Serial No. 785,326, filed Oct. 7, 1985 and now abandoned, which is a Continuation of application Serial No. 632,018, filed July 18, 1984 and now abandoned, which is a Continuation of application Serial No. 412,914, filed Aug. 30, 1982 and now abandoned.

FIELD OF THE INVENTION

This invention relates to production of an alpha, beta-ethylenically unsaturated aliphatic monocarboxylic acid. More specifically, this invention is directed to a catalyst suitable for production of an alpha, beta-ethylenically unsaturated aliphatic monocarboxylic acid by the vapor-phase condensation of a saturated aliphatic monocarboxylic acid with formaldehyde, and to the method of making such a catalyst.

BACKGROUND OF THE INVENTION

Unsaturated aliphatic monocarboxylic acids such as methacrylic acid, and the esters of such acids such as methyl methacrylate, are widely used for the production of corresponding polymers, resins and the like. Typically, a saturated aliphatic monocarboxylic acid, such as propionic acid (PA), can be catalytically reacted with formaldehyde (FA) to produce an alpha, beta-ethylenically unsaturated aliphatic monocarboxylic acid, such as methacrylic acid (MA), and water. The produced alpha, beta-ethylenically unsaturated monocarboxylic acid can be esterified to a polymerizable, alpha, beta-ethylenically unsaturated aliphatic monocarboxylic acid ester, such as methyl methacrylate (MMA), and water.

MMA is a monomer containing a carbon-carbon double bond and a carbonyl group

Polymers derived from MMA are sometimes also referred to as acrylic or acrylic-type polymers. The MMA-type polymers have good transparency, weatherability and physical strength properties. Typical end-uses for MMA-derived polymers include acrylic sheet that can be fabricated into signs, advertising displays, lighting fixtures, glazing materials, structural panels and the like, molding resins for automobile tail-light lenses, plumbing fixtures and the like, as well as constituents of a variety of surface coatings, adhesives, inks, floor polishes and the like.

Generally, the condensation reaction to produce an alpha, beta-ethylenically unsaturated aliphatic monocarboxylic acid, such as MA, takes place in the vapor or gas phase and in the presence of a basic or acidic catalyst, a substance which speeds up the rate at which a thermodynamically allowable chemical reaction takes place. In the absence of the catalyst, these reactants require addition of heat energy to overcome an "energy of activation" of the reaction, which can be a barrier to formation of the desired products. Also, in the case where the reactants form a variety of products, a catalyst may tend to increase the rate of formation of one product relative to one or more of the other products. Such a catalyst is said to have increased selectivity to that particular product.

Commercial catalyst suitable for MA production are complex composition of matter comprising a relatively high-area solid support and a catalytically active ingredient on the support. The precise chemical and physical structure of the catalyst and its support or carrier determine the effectiveness of the catalyst per se.

It is generally well-recognized by those skilled in the art that the activity of a catalyst is determined by a variety of catalyst physical properties, such as surface area, pore size, pore-size distribution, surface hydration and oxidation, and the like. Occasionally, the structure or physical state of the support or carrier material per se—e.g. amorphous or crystalline state—affects catalyst performance. Some of these physical properties, such as porosity and surface area, are related. Accordingly, a modification of the method of catalyst preparation from a known procedure so as to desirably alter one property may undesirably alter an other property. Thus, to achieve desired catalytic activity it is often necessary to precisely control catalyst production parameters to produce a catalyst or catalyst support having a number of relatively specific physical properties.

The activity of a catalyst is another important consideration; higher activity manifests itself in a relatively lower temperature for a given conversion. The activity of a catalyst is the relative ease or difficulty of the catalyst to effect chemical conversion of the reactants to desired products, at a given temperature. At a particular temperature, for example, a commercially acceptable percentage of the reactants may be converted to the desired product, with only a relatively minor percentage of the reactants being converted to an undesired by-product or undesired by-products. Typically, an increase in the temperature of the reaction not only tends to increase the rate at which the reactants are converted to the desired product or products, but may also tend to increase the rate at which the undesired by-products are produced as well.

Catalysts which are commonly used for reacting PA with FA to produce MA are alkali metals supported on silica. Typical catalysts of this type are disclosed in U.S. Pat. No. 4,147,718 to Gaenzler et al., U.S. Pat. No. 3,933,888 to Schlaefer, U.S. Pat. No. 3,840,587 to Pearson, U.S. Pat. No. 3,247,248 (see also Canadian Pat. No. 721,773) to Sims et al., and U.S. Pat. No. 3,014,958 to Koch et al.

The teachings of these various references can be readily distinguished from the present invention. In particular, U.S. Pat. No. 4,147,718 to Gaenzler et al. discloses a catalyst composition which necessarily includes $Al_2O_3$, $TiO_2$, or both. Neither U.S. Pat. 3,840,587 to Pearson nor U.S. Pat. No. 3,014,958 to Koch et al. specifically shows activity of a catalyst comprising cesium on a silica support. Also, the Pearson patent specifically teaches away from the present invention in that the Pearson patent is directed to a catalyst having a significantly greater surface area than the catalyst of the present invention. U.S. Pat. No. 3,933,888 to Schlaefer and U.S. Pat. No. 3,247,248 to Sims et al. each disclose a catalyst having a markedly different cesium concentration from that contemplated by the present invention. Moreover, the Schlaefer patent is directed to pyrogenic silica as the catalyst as well as the catalyst support material, and specifically teaches away from using silica gel as the catalyst support material.

Also, these prior-art catalysts, while effecting condensation of PA with FA to MA, unfortunately also generate appreciable amounts of undesirable by-products that have to be separated. Relatively low conversion and/or commercially unacceptable selectivity performance, together with relatively low catalyst useful-life are additional drawbacks of these prior-art catalysts.

Generally, when PA and FA are reacted in the vapor phase and in the presence of a catalyst to produce MA and $H_2O$, a number of undesirable by-products are simultaneously produced as well. The more common of these undesirable are 2,5-dimethyl-2-cylopenten-1-one (by-product A), 2,4,4-trimethyl-gamma-butyrolactone (by-product B), 3-pentanone (by-product 3-P), and ethyl isopropenyl ketone (by-product EIK). The presence of these by-products is generally undesirable because current MA-esterification and MMA-polymerization technology requires separation of these by-products either from the MA before it is esterified to MMA, or before the produced MMA is polymerized. It is additionally desirable to remove by-product A from the MA prior to esterification as the presence of this by-product tends to cause an undesirable polymerization of MA and attendant separation problems. Loss of product also may become significant.

A number of the conventional catalysts that are used to produce alpha, beta-ethylenically unsaturated monocarboxylic acids, such as methacrylic acid, are known to undergo a short-term deactivation while on feed. In practice, such short-term catalyst deactivation is overcome by interrupting the feed and then treating the catalyst with an air burn to remove accumulated carbon or other organic material. This procedure is herein referred to as "decoking" of the catalyst. It is desirable to extend the length of time on feed between such decokings, not only to optimize productivity of the desired product but also to increase overall efficiency of the process as well. It is also desirable to reduce formation of coke and tar on the catalyst, the formation of which causes loss of catalyst activity and thus decreases the short-term life of the catalyst.

Accordingly, it would be desirable to have a catalyst which provides improved PA conversion and improved selectivity to MA, which decreases undesirable by-product generation, and which enhances useful catalyst life as well. The catalyst of the present invention meets the foregoing desires.

SUMMARY OF THE INVENTION

The particulate catalyst of the present invention is especially suitable for condensation of a saturated aliphatic monocarboxylic acid, such as propionic acid, with formaldehyde to produce an alpha, beta-ethylenically unsaturated aliphatic monocarboxylic acid, such as methacrylic acid. The present catalyst comprises a catalyst support constituted by porous silica gel, and cesium ions in a $+1$ oxidation state on the catalyst support surface. The catalyst support has a surface area of about 50 to about 150 $m^2$/gram, a porosity of less than about 1 $cm^3$/gram, and a pore-size distribution such that less than about 10 percent of the pores present in the catalyst have a pore diameter greater than about 750 Angstroms. The cesium ions are present on the catalyst support in an amount of about 4 to about 10 percent by weight, based on the weight of the catalyst.

The catalyst can be prepared by combining, with agitation, a silica sol and a cesium compound that is able to provide cesium in a $+1$ oxidation state on the support surface. The silica sol has a silica particle diameter of about 50 to about 200 Angstroms. The silica sol and the cesium compound are combined in relative amounts sufficient to produce a freely-flowing slurry having a $Cs/(SiO_2+Cs)$ weight ratio of about 0.04 to about 0.1. The freely-flowing slurry is first solidified to a gel that is then dried to a crushable solid state. The dried gel is calcined for a time period sufficient to remove therefrom primarily adsorbed moisture.

The catalyst of the present invention is not only more active than conventional catalysts, but exhibits improved selectivity to MA as well. Attendant reduction of reaction temperature for a given conversion tends to increase the useful life of the catalyst per se, and may reduce overall operating costs as an added benefit as well. The manifested reduction in the amounts of the undesirable by-products produced when using the present catalyst, moreover, tends to reduce, and may even eliminate, costs attendant to (1) the removal of the unreacted PA and FA and the removal of undesirable by-products from the MA prior to esterification, and (2) the purification of the MMA prior to polymerization.

DETAILED DESCRIPTION OF PREFERRED EMBODIMENTS

The catalyst of the present invention is particularly well-suited for the gas-phase synthesis of an alpha, beta-ethylenically unsaturated aliphatic monocarboxylic acid, such as methacrylic acid (MA), via condensation of formaldehyde (FA) with a saturated aliphatic monocarboxylic acid, such as propionic acid (PA). The catalyst comprises monovalent cesium ions supported on a solid, particulate, porous silica gel catalyst carrier. The condensation reaction is carried out in a reactor suitable for effecting heterogeneous catalysis.

In operation, the reactor effluent includes not only the desired synthesis product, MA, but also co-product water, as well as unconverted PA and FA reactants, a variety of organic by-products and certain relatively volatile gases. The produced MA is separated from the unconverted reactants and the organic by-products, and thereafter can be esterified with a lower aliphatic alcohol such as methanol (MeOH), and then purified to obtain a polymer-grade ester such as methyl methacrylate (MMA).

In the ensuing detailed description, certain terms will be utilized for conciseness and ease of describing the features of the present invention. These terms are defined hereinbelow.

The term "calcining" as used herein means subjecting dried material to a temperature of at least about 250° C. (about 482° F.).

The term "colloid" as used herein means a suspension of finely divided particles that do not settle out of, and cannot be readily filtered from, the medium in which they are suspended.

The term "drying" as used herein means subjecting the materials to be dried to a temperature of no more than about 250° C. (about 482° F.).

The term "WHSV" means weight hourly space velocity, and is expressed as grams of feed per gram of catalyst per hour.

The term "silica gel" describes a coherent, rigid, continuous three-dimensional network of spherical particles of silica. It is an inorganic gel that does not possess an ordered crystal structure. Silica gel is constituted primarily by silica ($SiO_2$) in amorphous state.

The term "colloidal silica" describes a dispersion of typically millimicron-size $SiO_2$ particles in an aqueous or organic solvent. Colloidal silica is also sometimes referred to as "silica sol." Illustrative silica sols are those commercially available from the Nalco Chemical Company, Oakbrook IL 60521, under the designations Nalco 1034-A and Nalco 2326 silica sols. Nalco 1034-A silica sol has a silica concentration of about 34 weight percent, based on the weight of the silica sol, a mean silica particle size of about 20 nanometers (about 200 Angstroms), a pH of about 3.2, a particulate surface area of 150 m$^2$/gram of $SiO_2$, a viscosity of about 10 centipoises, and a $Na_2O$ content of less than about 0.05 wt.-%, based on the weight of the silica sol. Nalco 2326 silica sol is an ammonium-stabilized silica sol, has a silica concentration of about 14.5 weight percent, based on the weight of the silica sol, has a mean silica particle size of about 5 nanometers (about 50 Angstroms), exhibits a pH of about 9, has a particulate surface area of about 600 m$^2$/gram of $SiO_2$, has a viscosity of about 5 centipoises, and has a $Na_2O$ content of less than about 0.05 wt.-%, based on the weight of the silica sol.

The term "pyrogenic silica" describes an amorphous silica that is formed at relatively high temperature by condensation of $SiO_2$ from the vapor phase or at a relatively low temperature by chemical reaction in the vapor phase followed by condensation. Pyrogenic silica particles are typically about 3 to about 10 nanometers in diameter. Particulate pyrogenic silicas typically have surface areas of about 50 to about 380 m$^2$/gram of $SiO_2$ as well as relatively high porosity. Pyrogenic silica is an extremely pure form of $SiO_2$ and is comprised of particles having surface silanol—SiOH) groups which determine the physical and chemical surface properties of the pyrogenic silica. (Kirk-Othmer Encyclopedia of Chemical Technology, 3rd edition, Volume 17, 1982, page 812.)

The term "short-term catalyst life" means that time period between de-cokings during which the catalyst exhibits useful catalytic activity. De-coking is effected when the MA-synthesis performance of the catalyst falls below a predetermined criterion, e.g., certain percent conversion. Time required to de-coke a catalyst is also a consideration when evaluating overall catalyst performance. Longterm performance of a catalyst includes not only a consideration of the time period between de-cokings but also the overall time period during which the catalyst exhibits desired catalytic activity.

The terms "average pore radius" and "average pore diameter" as used herein mean the respective dimensions as determined utilizing the well-known BET nitrogen desorption method. [See, e.g., S. Brunauer et al., J.A.C.S., 60, 309, (1938).] The reported values are those representing a pore radius or diameter where one-half of the pore volume present exhibits a radius or diameter smaller than the reported value and one-half of the pore volume present exhibits a radius or diameter greater than the reported value, respectively.

Yield ($Y$), based on propionic acid:

$$\% \ Y(PA) = \frac{\text{moles of } MA \text{ produced}}{\text{moles of } PA \text{ in feed}} \times 100$$

Yield ($Y$), based on formaldehyde:

$$\% \ Y(FA) = \frac{\text{moles of } MA \text{ produced}}{\text{moles of } FA \text{ in feed}} \times 100$$

Methacrylic acid selectivity ($S$), based on propionic acid:

$$\% \ S(PA) = \frac{\text{moles of } MA \text{ produced}}{\text{moles of } PA \text{ reacted}} \times 100$$

Methacrylic acid selectivity ($S$), based on formaldehyde:

$$\% \ S(FA) = \frac{\text{moles of } MA \text{ produced}}{\text{moles of } FA \text{ reacted}} \times 100$$

Conversion ($C$):

$$\% \ C = \frac{\% \ Y}{\% \ S} \times 100$$

Similarly terminology will be utilized to describe the yield, selectively and conversion of the organic by-products when the performance of the present catalyst is discussed.

The catalyst support suitable for the purposes of the present invention preferably is silica gel, which, in the form used for catalyst support, has not been observed to exert a noticeable catalytic effect vis-a-vis the condensation reaction.

The particulate catalyst of the present invention comprises a catalyst support constituted by porous silica gel, and cesium ions in the +1 oxidation state present on the catalyst support surface in certain well-defined amounts, as will be discussed in greater detail hereinbelow. The catalyst may also include a relatively small amount of boron. Preferably, boron is present in an amount up to about 500 parts by weight per million parts by weight of the catalyst (p.p.m.), and more preferably is present in the range of about 200 to about 500 p.p.m.

The catalyst support has a surface area of about 50 to about 150 m$^2$/gram, preferably about 55 to about 140 m$^2$/gram, a porosity of less than about 1 cm$^3$/gram, preferably about 0.4 to about 0.6 cm$^3$/gram, and a pore-size distribution such that less than about 10 percent of the pores present in the catalyst have a pore diameter greater than about 750 Angstroms. In particular, a majority of the pores present in the catalyst preferably have a pore diameter of about 80 to about 300 Angstroms. Most preferably, the average pore diameter is about 150 to about 220 Angstroms. The pore size distribution can be controlled by appropriate selection of the silica particle size and particle size distribution in the silica sol that is used as one of the starting materials for the present catalyst support. For example, a silica particle size of about 20 nanometers (200 Angstroms) will provide a relatively larger pore size than a silica particle size of about 5 nanometers (50 Angstroms), and a mixture of different silica particle sizes in the silica sol will result in a relatively broader pore size distribution.

The cesium ions are present on the catalyst support surface in the +1 oxidation state and in an amount of about 4 to about 10 percent by weight, based on the weight of the catalyst. The cesium concentration on the catalyst support is important inasmuch as catalyst activity and selectivity to PA decrease outside of this particular concentration range. In addition, at cesium concentrations below about 4 percent by weight selectivity to by-products increase. The catalyst support surface preferably has an average cesium ion site density of about 1 to about 10 cesium ions per square nanometer of catalyst support surface area, and more preferably has an average cesium ion site density of about 1 to about 6 cesium ions per square nanometer. The average cesium on site density in any given instance is determined by the amount of cesium compound used in making the catalyst together with the surface area of the catalyst support.

In addition, when the cesium ions are present on the catalyst support in the range of about 7 to about 10 percent by weight, based on the weight of the catalyst, this catalyst possesses enhanced resistance to short-term deactivation.

One method for making the catalyst of the present invention comprises the steps of producing a freely-flowing slurry having a $Cs/(SiO_2+Cs)$ weight ratio of about 0.04 to about 0.1, solidifying the produced slurry to a gel, drying the obtained gel to a crushable solid state, and calcining the dried gel for a time period sufficient to remove primarily adsorbed moisture therefrom. More particularly, this freely-flowing slurry is produced by combining respective amounts of (1) a silica sol having a silica particle diameter of about 50 to about 200 Angstroms and (2) a cesium compound able to provide on the catalyst support cesium in the +1 oxidation state. The foregoing slurry constituents are combined with agitation to produce a substantially uniform admixture which is then gelled, dried and calcined.

Preferably, the silica sol used in the production of the freely-flowing slurry is aqueous and has a silica content of about 14 to about 34 weight percent, based on the weight of the silica sol, and has a mean particle size of about 5 to about 20 nanometers (about 50 to about 200 Angstroms). As pointed out before, however, the pore size of the produced catalyst support can be adjusted by modulating the particle size distribution of the silica sol utilized. For example, silica sols having different mean particle sizes can be commingled in various proportions prior to gelling. Nonaqueous, i.e., organic, silica sols can also be used either alone or emulsified with an aqueous silica sol to further modulate the ultimate pore size.

The cesium compound able to provide $Cs^{+1}$ can be relatively volatile, water or solvent soluble, or thermally decomposable.

Illustrative decomposable cesium compounds include cesium borofluoride ($CsBF_4$), cesium bromate ($CsBrO_3$), cesium bromochloride iodide ($CsIBrCl$), cesium dibromoiodide ($CsIBr_2$), cesium perchlorate ($CsClO_4$), cesium dichloroiodide ($CsICl_2$), cesium permanganate ($CsMnO_4$), cesium nitrate ($CsNO_3$), cesium oxide ($Cs_2O$), and the like.

Illustrative volatile cesium compounds include cesium dibromochloride ($CsBr_2Cl$), cesium formate [$(Cs(CHO_2 \cdot H_2O)$], cesium hydrofluoride ($CsF \cdot HF$), cesium hydrogencarbide ($CsHC_2$), cesium hydroxide ($CsOH$), cesium pentaiodide ($CsI_5$), cesium triiodide ($CsI_3$), cesium hydrogen nitrate ($CsNO_3 \cdot HNO_3$), cesium dihydrogen nitrate ($CsNO_3 \cdot 2HNO_3$), cesium peroxide ($Cs_2O_2$), cesium trioxide ($Cs_2O_3$), cesium propionate [$Cs(C_3H_5O_2)$], and the like. Illustrative cesium compounds which are water soluble include cesium acetate [$Cs(C_2H_3O_2)$], cesium benzoate [$Cs(C_7H_5O_2)$], cesium monobromide ($CsBr$), cesium carbonate ($Cs_2CO_3$), cesium bicarbonate ($CsHCO_3$), cesium chlorate ($CsClO3$), cesium chloride ($CsCl$), cesium chromate ($Cs_2CrO_4$), cesium fluoride ($CsF$), cesium fluosilicate ($Cs_2SiF_6$), cesium formate ($CsCHO_2$), cesium hydroxide ($CsOH$), cesium iodide ($CsI$), cesium nitrate ($CsNO_3$), cesium oxalate ($Cs_2C_2O_4$), cesium salicylate [$Cs(C_7H_5O_3)$], cesium selenate ($Cs_2SeO_4$), and cesium hydrogen tartrate [$(CsH(C_4H_4O_6)$]. The cesium compound may also be one that is soluble in an organic solvent which may be water miscible or which may be water immiscible. Preferred are monovalent cesium compounds selected from the group consisting of cesium carbonate, cesium oxide, cesium hydroxide, cesium phosphate, cesium fluoride and cesium nitrate. Particularly preferred is cesium carbonate.

For compounding the starting materials for the catalyst, a monovalent cesium salt in an aqueous solution and in a relatively high cesium-salt concentration, usually approaching saturation for the particular salt that is utilized, is preferred. More dilute solutions can be used, if desired.

The produced, freely-flowing slurry can include boric acid as a boron source in the event the presence of boron is desired. When included in the produced, freely-flowing slurry, boric acid is present in an amount of no more than about 0.1%, and is preferably present in an amount of about 0.03% to about 0.08%.

The produced, freely-flowing slurry can also include a suitable gelling promoter. Many of the cesium compounds disclosed herein can act as gelling promoters. It is preferable, however, to add a specific gelling promoter, so as to provide a catalyst having desired physical properties within a given period of time. A suitable gelling promoter for this purpose is ammonium nitrate ($NH_4NO_3$). The concentration of the gelling promoter in the slurry can be in the range of about 0.5% to about 1.5%.

To promote gelling rate, the pH of the produced, freely-flowing slurry can be adjusted to about 7. An inorganic acid, preferably nitric acid, is used for such a pH-adjustment purpose.

In one method aspect of this invention, the produced gel can be formed into beads or cylinders or other shapes of a desired configuration, and then dried. Preferably, the drying is carried out at about atmospheric pressure. Alternatively, the drying step can be carried out at a subatmospheric pressure and at a relatively lower temperature, e.g. about 150° C. (about 300° F.) and below. The gel is dried to a crushable solid state. It is preferred to dry the gel to a substantially constant weight. Drying can be carried out in ambient atmosphere or in an inert atmosphere as desired.

When the gel is dried as a sheet-form material, the dried gel can be comminuted, e.g. by crushing, prior to further heat treatment.

Calcining of the dried gel is carried out for a time period sufficient to reduce the weight of the dried gel by at least about 2%. Calcining preferably is carried out at a temperature of about 540° C. (about 1000° F.) for a time period of about 8 hours.

In the examples appearing below, the following conditions were maintained, and the following equipment and procedures were used, unless otherwise indicated.

Reagent-grade trioxane was used as the Fa source; however, in the conversion of PA with FA in the presence of the catalyst of this invention to produce MA, any suitable source of formaldehyde can be used, such as formalin, paraformaldehyde, methanolic formaldehyde, substantially anhydrous formaldehyde, and the like.

A laboratory minireactor was used to evaluate the MA-synthesis performance of each catalyst. All experimental runs were made at a PA/FA mole ratio of about 3/2. The minireactor comprised an elongated 12.7 mm. O.D. quartz tube having an externally-controllable thermowell longitudinally disposed in and along the longitudinal axis of the quartz tube. Catalyst to be tested was placed in the quartz tube and about the thermowell, thereby forming an annular catalyst bed. Each bed of catalyst contained about 2.0 to about 3.0 grams of catalyst having a particle size of about 20 to about 40 mesh (U.S. Sieve). A spun quartz plug supported each catalyst bed.

The trioxane was thermally cracked by passing the feed through a hot reactor zone, heated to a temperature of about 390° to about 440° C., and located above the catalyst zone.

The minireactor was operated at WHSV values between about 0.95 and about 2.59. Variations in the WHSV value within this range were not observed to affect the relationship between conversion and selectivity of the catalysts being tested.

Initial performance studies were generally carried out by running each catalyst for about 30 minutes prior to collecting the desired number of aliquot samples for analytical purposes, and thereafter decoking with air before removing additional aliquot samples. This was done to reduce the influence of a variable build-up of coke upon catalyst performance.

General sampling procedures for analytical purposes included collection of about 10 to about 25 grams of the reactor effluent in a tared U-tube or Erlenmeyer-type receiver containing about 10 to about 25 ml. of isopropanol and at room temperature (i.e. about 25° C.). Reactor effluent samples were analyzed by gas chromatography (GC). An internal standard technique was used. That is, the GC response for each of the organic components in the minireactor effluent was based upon the known response of the GC to an internal standard added to the sample. Actual PA titrations indicated that the propionic acid used in the feed was at least about 99.6 to about 99.9% pure.

Unless otherwise stated, pore volume, surface area and average pore diameter were determined by the BET nitrogen desorption test.

Each of the Tables appearing below presents the MA-synthesis performance data of a single catalyst over a period of time, unless stated otherwise. Also, the reported percentages of cesium are by weight, based on the weight of the catalyst.

EXAMPLE 1

MA-Synthesis Performance of the Catalyst as a Function of Cs Loading

Several catalysts with different cesium loadings or amounts were made and subjected to MA-synthesis testing in the minireactor. The results are summarized in Tables I-X, below.

Tables I and II present the MA-synthesis performance data of two different catalysts containing about 12 to about 13 wt.-% cesium, one catalyst (Table I) made using Nalco 2326 silica sol and the other catalyst (Table II) made using Nalco 1034-A silica sol. Each catalyst contained boron in an amount of about 500 parts by weight per million parts by weight of the catalyst (p.p.m.). These catalysts were each prepared as follows.

A slurry was formed by combining, with agitation, silica sol [about 592.8 grams of Nalco 2326 silica sol, 14.5 wt.-% particulate $SiO_2$, mean particle size of about 5 nanometers (Table I); or about 252.8 grams of Nalco 1034-A silica sol, 34 wt.-% particulate $SiO_2$, mean particle size of about 20 nanometers (Table II)] and $H_3BO_3$ (about 0.29 grams) dissolved in deionized water (about 15 milliliters). To these agitated ingredients was admixed $Cs_2CO_3$ (about 17.2 grams) dissolved in deionized water (about 50 milliliters). The slurry was further agitated until gelation occurred (about 3 to about 30 minutes) after which the gel was set aside for about 1 hour. The produced gel was then dried to a constant weight in a microwave oven, subsequently crushed and sieved to about 20 to about 40 mesh (U.S. Sieve Series), and thereafter calcined in air at about 540° C. (about (1000° F.) for about 8 hours.

TABLE I

MA-Synthesis Performance of 12.2 wt. % Cesium Catalyst

| Run No. | % PAC | % PAS | % PAY | T (°C.) | WHSV | % S A | % S B | % S 3-P |
|---|---|---|---|---|---|---|---|---|
| 1 | 26.4 | 85 | 22 | 301 | 1.50 | 0.8 | 0.8 | 0.8 |
| 2 | 27.9 | 85 | 24 | 309 | 1.50 | 0.6 | 0.9 | 0.8 |
| 3 | 30.2 | 84 | 25 | 318 | 1.52 | 0.7 | 1.1 | 0.7 |
| 4 | 35.8 | 71 | 26 | 326 | 1.54 | 0.8 | 1.5 | 0.7 |
| 5 | 39.5 | 66 | 26 | 336 | 1.51 | 1.2 | 2.1 | 0.8 |
| 6 | 42.5 | 61 | 26 | 345 | 1.50 | 1.6 | 2.9 | 0.9 |
| 7 | 20.5 | 87 | 18 | 300 | 1.51 | 0.0 | 0.8 | 0.8 |
| 8 | 23.4 | 85 | 20 | 309 | 1.52 | 0.3 | 1.0 | 0.8 |
| 9 | 27.8 | 82 | 23 | 319 | 1.52 | 0.5 | 1.4 | 0.8 |
| 10 | 29.4 | 79 | 23 | 321 | 1.53 | 0.5 | 1.5 | 0.6 |

TABLE II

MA-Synthesis Performance of 13.2 wt. % Cesium Catalyst

| Run No. | % PAC | % PAS | % PAY | T (°C.) | WHSV | % S A | % S B | % S 3-P |
|---|---|---|---|---|---|---|---|---|
| 1 | 19.8 | 92 | 18 | 302 | 1.55 | 0.0 | 0.5 | 0.0 |
| 2 | 24.0 | 86 | 21 | 310 | 1.50 | 0.3 | 0.7 | 0.5 |
| 3 | 29.4 | 76 | 22 | 319 | 1.48 | 0.4 | 0.8 | 0.3 |
| 4 | 37.1 | 61 | 22 | 327 | 1.49 | 0.5 | 0.9 | 0.4 |
| 5 | 39.5 | 60 | 24 | 336 | 1.44 | 0.8 | 1.5 | 0.5 |
| 6 | 44.0 | 52 | 23 | 344 | 1.41 | 1.1 | 2.0 | 0.6 |
| 7 | 19.2 | 90 | 17 | 301 | 1.42 | 0.0 | 0.5 | 0.0 |
| 8 | 22.7 | 88 | 20 | 310 | 1.44 | 0.2 | 0.7 | 0.5 |
| 9 | 27.3 | 79 | 22 | 318 | 1.45 | 0.4 | 0.8 | 0.4 |
| 10 | 30.0 | 75 | 23 | 322 | 1.42 | 0.4 | 1.0 | 0.6 |

Table III presents the MA-synthesis performance data of a 9.17 wt.-% cesium catalyst containing about 440 p.p.m. boron and Table IV presents the MA-synthesis performance data of a 7.3 wt.-% cesium catalyst containing about 470 p.p.m. boron. Both catalysts were prepared as follows. A slurry was formed by combining, with agitation, silica sol (about 270.44 grams of Nalco 1034-A silica sol; 34 wt.-% particulate $SiO_2$; mean particle size of about 20 nanometers) and $H_3BO_3$ (about 0.29 grams) dissolved in de-ionized water (about 15 milliliters). To these agitated ingredients was admixed $Cs_2CO_3$ (about 12.26 grams and about 9.81 grams, respectively) dissolved in de-ionized water (about 50 milliliters). After 15 minutes of further agitation, ammonium nitrate (about 2.7 grams) dissolved in de-ionized water (about 5 milliliters) was added to promote gelling. Nitric acid was added dropwise until gelation occurred. The produced gel was then dried in a microwave oven, subsequently crushed and sieved to −20 (undersize) and +40 (oversize) mesh (U.S. Sieve Series), and thereafter calcined in air at about 540° C. (about 1000° F.) for 8 hours.

TABLE III

MA-Synthesis Performance of 9.17 wt. % Cesium Catalyst

| Run No. | % PAC | % PAS | % PAY | T (°C.) | WHSV | % S A | % S B | % S 3-P | % S EIK |
|---|---|---|---|---|---|---|---|---|---|
| 1 | 26 | 87 | 22 | 301 | 1.43 | 0.5 | 0.3 | 0.4 | 0.2 |
| 2 | 20 | 89 | 18 | 292 | 1.43 | 0.3 | 0.5 | 0.5 | 0.1 |
| 3 | 16 | 92 | 15 | 278 | 1.42 | 0.2 | 0.0 | 0.6 | 0.1 |
| 4 | 27 | 89 | 24 | 306 | 1.43 | 0.7 | 0.5 | 0.5 | 0.2 |
| 5 | 34 | 81 | 28 | 317 | 1.42 | 1.0 | 0.7 | 0.5 | 0.3 |
| 6 | 39 | 76 | 29 | 329 | 1.43 | 1.4 | 1.1 | 0.5 | 0.4 |
| 7 | 29 | 86 | 25 | 329 | 2.52 | 0.9 | 1.0 | 0.7 | 0.4 |
| 8 | 44 | 66 | 29 | 329 | 0.95 | 1.9 | 1.5 | 0.5 | 0.3 |
| 9 | 19 | 92 | 18 | 305 | 2.50 | 0.3 | 0.4 | 0.6 | 0.2 |
| 10 | 30 | 85 | 26 | 306 | 0.97 | 0.8 | 0.5 | 0.5 | 0.2 |
| 11 | 12 | 87 | 10 | 282 | 2.51 | 0.1 | 0.0 | 0.6 | 0.1 |
| 12 | 20 | 90 | 18 | 283 | 0.97 | 0.3 | 0.4 | 0.6 | 0.2 |
| 13 | 33 | 82 | 27 | 339 | 2.52 | 1.3 | 1.6 | 0.8 | 0.6 |
| 14 | 40 | 69 | 28 | 351 | 2.52 | 1.8 | 2.6 | 0.8 | 0.8 |

TABLE IV

MA-Synthesis Performance of 7.3 wt. % Cesium Catalyst

| Run No. | % PAC | % PAS | % PAY | T (°C.) | WHSV | % S A | % S B | % S 3-P | % S EIK |
|---|---|---|---|---|---|---|---|---|---|
| 1 | 50 | 60 | 30 | 349 | 1.44 | 6.2 | 3.6 | 0.6 | 1.4 |
| 2 | 46 | 71 | 23 | 337 | 1.44 | 4.9 | 2.7 | 0.6 | 1.3 |
| 3 | 40 | 76 | 31 | 326 | 1.44 | 2.6 | 1.4 | 0.5 | 0.5 |
| 4 | 32 | 90 | 29 | 314 | 1.43 | 2.0 | 1.2 | 0.4 | 0.0 |
| 5 | 30 | 88 | 26 | 307 | 1.44 | 1.4 | 0.9 | 0.4 | 0.0 |
| 6 | 28 | 85 | 24 | 303 | 1.45 | 1.2 | 0.6 | 0.4 | 0.0 |
| 7 | 24 | 90 | 22 | 297 | 1.45 | 0.8 | 0.5 | 0.4 | 0.3 |
| 8 | 32 | 86 | 28 | 314 | 1.44 | 1.5 | 1.0 | 0.4 | 0.0 |
| 9 | 24 | 91 | 22 | 314 | 2.53 | 0.9 | 1.0 | 0.6 | 0.0 |
| 10 | 29 | 89 | 25 | 325 | 2.54 | 1.6 | 1.5 | 0.7 | 0.6 |
| 11 | 34 | 85 | 29 | 337 | 2.53 | 2.6 | 2.4 | 1.0 | 0.9 |
| 12 | 30 | 90 | 27 | 303 | 0.99 | 1.4 | 0.8 | 0.7 | 0.5 |
| 13 | 24 | 95 | 22 | 291 | 0.98 | 0.8 | 0.5 | 0.7 | 0.3 |
| 14 | 35 | 85 | 30 | 313 | 0.98 | 2.1 | 1.3 | 0.7 | 0.7 |

Table V presents the MA-synthesis performance data of a 6.3 wt.-% cesium catalyst containing about 470 p.p.m. of boron. This catalyst was prepared according to the method described above in connection with Table III.

TABLE V

MA-Synthesis Performance of 6.3 wt. % Cesium Catalyst

| Run No. | % PAC | % PAS | % PAY | T (°C.) | WHSV | % S A | % S B | % S 3-P |
|---|---|---|---|---|---|---|---|---|
| 1 | 36.3 | 77 | 28 | 310 | 1.59 | 4.1 | 2.0 | 1.2 |
| 2 | 37.0 | 81 | 30 | 315 | 1.59 | 4.5 | 2.2 | 0.9 |
| 3 | 43.9 | 72 | 31 | 327 | 1.60 | 5.7 | 3.0 | 0.9 |
| 4 | 17.1 | 91 | 16 | 278 | 1.62 | 0.7 | 0.6 | 1.1 |
| 5 | 49.0 | 66 | 32 | 337 | 1.60 | 7.5 | 4.4 | 0.8 |
| 6 | 24.6 | 90 | 22 | 294 | 1.60 | 1.6 | 1.2 | 1.1 |
| 7 | 31.5 | 82 | 26 | 306 | 1.60 | 2.1 | 1.4 | 0.8 |
| 8 | 35.2 | 84 | 29 | 314 | 1.60 | 3.1 | 2.0 | 0.9 |
| 9 | 27.3 | 87 | 24 | 301 | 1.61 | 1.5 | 1.2 | 0.9 |
| 10 | 28.8 | 88 | 25 | 304 | 1.60 | 1.7 | 1.3 | 0.9 |
| 11 | 22.0 | 93 | 20 | 293 | 1.60 | 0.9 | 0.9 | 1.0 |

Table VI presents the MA-synthesis performance data of a 5.53 wt.-% cesium catalyst containing about 470 p.p.m. of boron. The catalyst was prepared according to the method described above in connection with Table III.

TABLE VI

MA-Synthesis Performance of 5.53 wt. % Cesium Catalyst

| Run No. | % PAC | % PAS | % PAY | T (°C.) | WHSV | % S A | % S B | % S 3-P | % S EIK |
|---|---|---|---|---|---|---|---|---|---|
| 1 | 57 | 45 | 26 | 356 | 1.44 | 8.0 | 6.2 | 0.8 | 1.4 |
| 2 | 53 | 53 | 28 | 350 | 1.44 | 6.6 | 5.1 | 0.7 | 1.2 |
| 3 | 48 | 62 | 30 | 338 | 1.44 | 5.6 | 3.2 | 0.7 | 0.9 |
| 4 | 40 | 75 | 30 | 327 | 1.44 | 4.0 | 2.2 | 0.6 | 0.6 |
| 5 | 34 | 82 | 28 | 316 | 1.44 | 3.0 | 1.6 | 0.6 | 0.5 |
| 6 | 29 | 81 | 24 | 304 | 1.44 | 1.7 | 0.9 | 0.6 | 0.3 |
| 7 | 23 | 85 | 20 | 293 | 1.44 | 1.2 | 0.6 | 0.6 | 0.3 |
| 8 | 28 | 90 | 26 | 326 | 2.54 | 3.2 | 2.4 | 1.0 | 0.7 |
| 9 | 23 | 94 | 22 | 315 | 2.54 | 1.9 | 1.5 | 0.8 | 0.7 |
| 10 | 19 | 97 | 18 | 305 | 2.54 | 1.2 | 1.0 | 0.7 | 0.3 |
| 11 | 26 | 92 | 25 | 304 | 1.44 | 2.0 | 1.1 | 0.6 | 0.4 |
| 12 | 28 | 91 | 25 | 327 | 2.53 | 2.8 | 2.2 | 0.8 | 0.4 |
| 13 | 54 | 54 | 29 | 356 | 1.44 | 7.5 | 5.1 | 1.0 | 1.4 |
| 14 | 50 | 61 | 30 | 350 | 1.44 | 6.1 | 4.3 | 0.9 | 1.1 |

Table VII presents the MA-synthesis performance data of a 3.88 wt.-% cesium catalyst containing about 420 p.p.m. of boron, and Table VIII presents the MA-synthesis performance data of a 2.02 wt.-% cesium catalyst containing about 450 p.p.m. of boron. These catalysts were prepared as described above in connection with Table III.

TABLE VII

MA-Synthesis Performance of 3.88 wt. % Cesium Catalyst

| Run No. | % PAC | % PAS | % PAY | T (°C.) | WHSV | % S A | % S B | % S 3-P | % S EIK |
|---|---|---|---|---|---|---|---|---|---|
| 1 | 49 | 64 | 32 | 349 | 1.43 | 7.3 | 4.3 | 1.0 | 1.2 |
| 2 | 38 | 82 | 31 | 330 | 1.42 | 4.8 | 2.3 | 0.9 | 0.8 |
| 3 | 34 | 86 | 30 | 324 | 1.41 | 3.9 | 1.9 | 0.8 | 0.7 |
| 4 | 32 | 88 | 28 | 318 | 1.43 | 3.4 | 1.6 | 0.8 | 0.6 |
| 5 | 32 | 88 | 28 | 312 | 1.43 | 3.3 | 1.2 | 0.8 | 0.6 |
| 6 | 26 | 90 | 23 | 307 | 1.43 | 2.2 | 1.0 | 0.8 | 0.4 |
| 7 | 22 | 96 | 22 | 301 | 1.43 | 1.8 | 0.8 | 0.8 | 0.4 |
| 8 | 21 | 92 | 19 | 296 | 1.43 | 1.4 | 0.6 | 0.8 | 0.3 |
| 9 | 19 | 88 | 17 | 289 | 1.43 | 1.0 | 0.4 | 0.7 | 0.3 |
| 10 | 16 | 90 | 14 | 285 | 1.43 | 0.8 | 0.2 | 0.8 | 0.3 |
| 11 | 17 | 72 | 12 | 278 | 1.43 | 0.5 | 0.0 | 0.7 | 0.2 |
| 12 | 13 | 97 | 13 | 279 | 1.43 | 0.7 | 0.0 | 0.9 | 0.3 |
| 13 | 23 | 89 | 21 | 301 | 1.32 | 1.6 | 0.8 | 0.8 | 0.4 |

TABLE VIII

MA-Synthesis Performance of 2.02 wt. % Cesium Catalyst

| Run No. | % PAC | % PAS | % PAY | T (°C.) | WHSV | % S A | % S B | % S 3-P | % S EIK |
|---|---|---|---|---|---|---|---|---|---|
| 1 | 35 | 77 | 27 | 349 | 1.38 | 5.9 | 2.9 | 1.7 | 1.2 |
| 2 | 26 | 87 | 23 | 330 | 1.39 | 4.1 | 1.7 | 1.5 | 0.8 |
| 3 | 24 | 85 | 21 | 325 | 1.40 | 3.3 | 1.4 | 1.4 | 0.6 |
| 4 | 22 | 85 | 19 | 319 | 1.35 | 2.1 | 1.1 | 1.3 | 0.5 |
| 5 | 19 | 94 | 18 | 315 | 1.32 | 1.9 | 1.0 | 1.3 | 0.5 |
| 6 | 17 | 90 | 15 | 309 | 1.37 | 1.4 | 0.7 | 1.2 | 0.4 |
| 7 | 22 | 86 | 19 | 320 | 1.33 | 2.1 | 1.1 | 1.3 | 0.6 |
| 8 | 20 | 98 | 20 | 320 | 1.35 | 2.2 | 1.1 | 1.4 | 0.6 |
| 9 | 22 | 90 | 20 | 320 | 1.31 | 2.0 | 1.0 | 0.1 | 0.6 |
| 10 | 22 | 87 | 19 | 320 | 1.35 | 1.9 | 1.0 | 1.1 | 0.5 |

Table IX presents the MA-synthesis performance data of a 1.2 wt.-% cesium catalyst containing about 280 p.p.m. of boron. This catalyst was prepared as described above in connection with Table III.

TABLE IX

MA-Synthesis Performance of 1.2 wt. % Cesium Catalyst

| Run No. | % PAC | % PAS | % PAY | T (°C.) | WHSV | % S A | % S B | % S 3-P | % S EIK |
|---|---|---|---|---|---|---|---|---|---|
| 1 | 32 | 80 | 26 | 349 | 1.46 | 4.3 | 2.4 | 1.6 | 1.1 |
| 2 | 27 | 85 | 23 | 337 | 1.46 | 3.0 | 1.6 | 1.5 | 0.8 |
| 3 | 21 | 88 | 18 | 326 | 1.46 | 2.1 | 1.2 | 1.8 | 0.7 |
| 4 | 16 | 91 | 15 | 314 | 1.45 | 1.5 | 0.7 | 1.7 | 0.6 |
| 5 | 37 | 75 | 28 | 361 | 1.44 | 5.3 | 3.1 | 2.1 | 1.6 |
| 6 | 43 | 69 | 30 | 373 | 1.44 | 6.1 | 4.0 | 2.3 | 2.0 |
| 7 | 36 | 76 | 27 | 373 | 2.43 | 4.3 | 3.0 | 2.4 | 1.7 |
| 8 | 30 | 84 | 25 | 362 | 2.38 | 3.1 | 2.2 | 2.3 | 1.3 |
| 9 | 23 | 86 | 20 | 349 | 2.42 | 2.2 | 1.5 | 2.1 | 1.0 |
| 10 | 34 | 74 | 25 | 349 | 0.99 | 4.3 | 2.4 | 1.8 | 1.3 |
| 11 | 28 | 82 | 23 | 338 | 1.00 | 3.2 | 1.8 | 1.8 | 1.0 |

Table X presents the MA-synthesis performance data of a 0.83 wt.-% cesium catalyst containing about 72 p.p.m. of boron. This catalyst was prepared by acid washing a portion of the 1.2 wt.-% cesium catalyst (Table IX) to a final cesium content of 0.83 wt.-% Cs after washing. That procedure was as follows. About 10 grams of the 1.2 wt.-% cesium catalyst was washed with three aliquots (about 40 milliliters, each) of 1 N nitric acid. Thereafter, the catalyst was rinsed with three aliquots (about 40 milliliters, each) of deionized water, and dried at about 120° C. (about 250° F.) for about 16 hours.

TABLE X

MA-Synthesis Performance of 0.83 wt. % Cesium Catalyst

| Run No. | % PAC | % PAS | % PAY | T (°C.) | WHSV | % S A | % S B | % S 3-P | % S EIK |
|---|---|---|---|---|---|---|---|---|---|
| 1 | 21 | 88 | 19 | 349 | 1.55 | 2.6 | 1.2 | 2.5 | 1.1 |
| 2 | 28 | 84 | 24 | 360 | 1.54 | 3.7 | 2.0 | 2.4 | 1.3 |
| 3 | 34 | 78 | 26 | 370 | 1.54 | 4.6 | 2.7 | 2.6 | 1.7 |
| 4 | 41 | 69 | 28 | 384 | 1.52 | 5.2 | 3.5 | 2.7 | 2.1 |
| 5 | 44 | 65 | 28 | 394 | 1.57 | 5.9 | 3.9 | 3.1 | 2.5 |
| 6 | 48 | 59 | 28 | 407 | 1.52 | 6.5 | 5.2 | 3.5 | 3.3 |
| 7 | 40 | 67 | 27 | 408 | 2.59 | 4.9 | 4.1 | 3.7 | 2.9 |
| 8 | 33 | 76 | 25 | 390 | 2.56 | 3.5 | 3.0 | 3.4 | 2.2 |
| 9 | 26 | 85 | 22 | 378 | 2.59 | 2.4 | 1.5 | 3.3 | 1.7 |
| 10 | 38 | 73 | 27 | 377 | 1.02 | 5.1 | 3.3 | 2.6 | 2.0 |
| 11 | 28 | 61 | 17 | 365 | 1.01 | 1.5 | 1.4 | 1.7 | 0.6 |
| 12 | 30 | 83 | 25 | 366 | 1.03 | 3.9 | 2.4 | 2.6 | 1.7 |

Summarizing, the temperature required (at a WHSV of about 1.4 to about 1.5 hr.−1.; for 30% conversion of PA decreased from about 364° C. (about 687° F.) for the 0.83 wt.-% cesium catalyst (Table X) to about 311° C. (about 592° F.) for the 3.88 wt.-% cesium catalyst (Table VII). At Cs concentrations of about 4 to about 10 wt.-% the temperature was observed to level out at about 305° C. (about 580° F.) to about 315° C. (about 600° F.).

Figure 1:
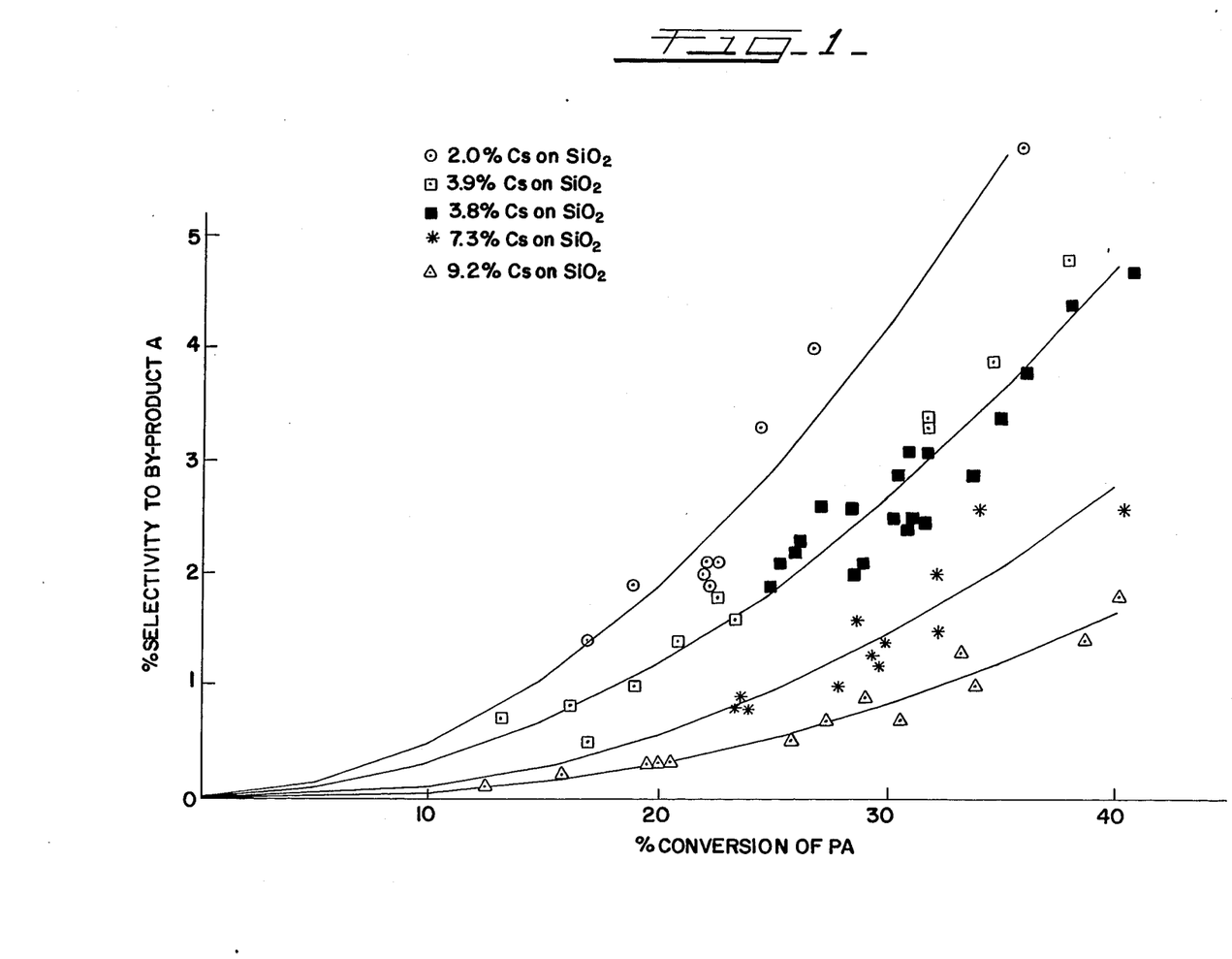
FIG. 1 is a graph illustrating the relationship of selectivity toward production of by-product A, as a function of conversion of propionic acid (PA), for a variety of cesium loadings.

The relative selectivity of some of these catalysts toward production of by-product A, as a function of PA conversion, is shown in FIG. 1. All of the data presented in FIG. 1 resulted from studies where the catalyst in the minireactor was always freshly decoked prior to taking a sample for analysis to minimize any biasing effect due to variable coke deposition.

Figure 2:
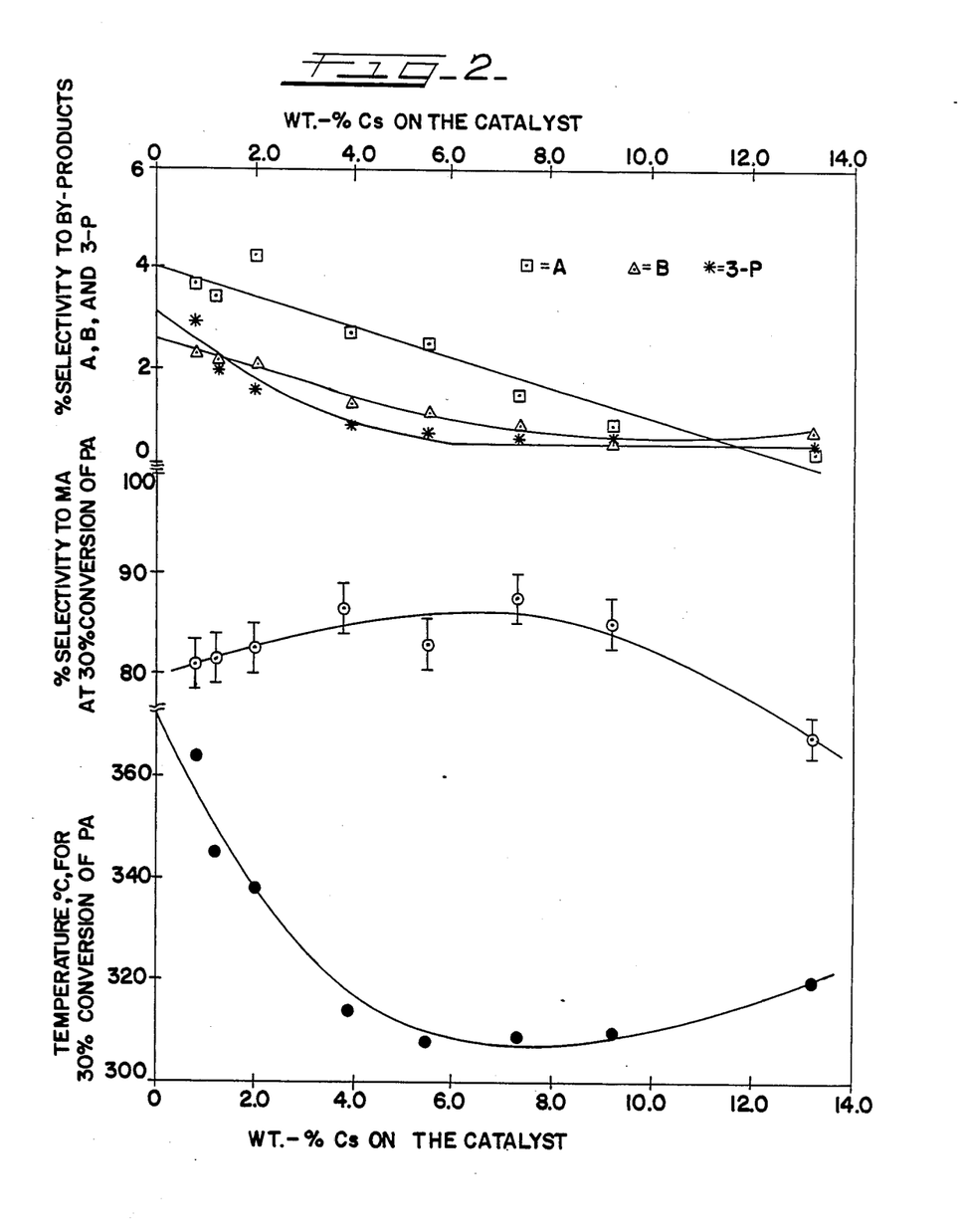
FIG. 2 is a tri-level graph showing (1) the temperature for 30% conversion of PA, (2) the % selectivity to MA at 30% conversion of PA, and (3) the % selectivity to by-products A, B and 3-P, as a function of wt.-% Cs based upon the weight of the catalyst.

The 13.2 wt.-% cesium catalyst (Table II) required a relatively higher temperature for 30% conversion to PA than the catalysts containing about 4 wt.-% Cs to about 10 wt.-% Cs, as is shown in FIG. 2. The activity of the catalyst is seen to increase up to a loading of about 4 wt.-% Cs, remains substantially constant between a loading of about 4 wt.-% Cs to about 10 wt.-% Cs, and then decreases slightly at increased Cs-loading levels. The reduction in temperature from, e.g., about 364° C. (about 687° F.) for the 0.83 wt.-% Cs catalyst to the range of about 308° C. (about 586° F.) to about 314° C. (about 597° F.), for the 3.88 wt.-% Cs and 9.17 wt.-% Cs catalysts tested, markedly improves catalyst lifetime as well.

Selectivities to MA (at 30% conversion of PA) at the 0.83 wt.-% Cs-loading, at the 1.2 wt.-% Cs-loading, and at the 2.02 wt.-% Cs-loading levels were observed to be about 81 to about 82 percent. On the other hand, Cs-loading levels of 3.88 wt.-% Cs (Table VII), 5.53 wt.-% CS (Table VI), 7.3 wt.-% Cs (Table IV) and 9.17 wt.-% Cs (Table III) demonstrate selectivities to MA at 30% conversion of about 85 to about 88 percent, which is a marked improvement of commercial significance. A Cs-loading level of about 13.2 wt.-% (Table II) demonstrated poorer selectivities to MA (i.e. about 76% ) at 30% conversion of PA. The observed general trend of selectivity to MA at 30% conversion of PA, as a function of wt.-% of Cs, can be readily seen in FIG. 2.

Also notable is the reduced selectivity toward production of the undesirable by-products A, B and 3-P, as is shown in FIGS. 1 and 2. In particular, at a conversion of about 30% of PA, the selectivity to by-product A decreased from about 4.2% for the 2.02 wt.-% Cs catalyst (Table VIII) to about 0.9% for the 9.17 wt.-% Cs catalyst (Table III). The reduction in selectivity to by-product A is of particular interest as the presence of by-product A is known to undesirably affect the polymerization of MA, resulting in product loss. The use of silica gel-based catalysts containing at least about 4 wt.-% Cs, and up to about 10 wt.-% Cs, thus offers a genuine benefit in the gas-phase synthesis of MA from FA and PA, particularly in terms of reduced selectivity toward by-product A.

EXAMPLE 2

Catalyst Physical Properties

Some of the catalysts described above in EXAMPLE 1 were subjected to analysis to determine surface area, pore volume and radius, and average cesium ion site density on the catalyst support surface (Cs/nm$^2$), as a function of cesium loading. Cesium loading was determined by conventional atomic absorption methods. Surface area (m$^2$/gram), cumulative pore volume (cm$^3$/gram), and average pore radius (Angstroms) were determined by the BET desorption technique identified above. Average cesium ion site density values on the catalyst support surface (Cs/nm²) were calculated assuming a substantially uniform distribution of the cesium on the surface of the catalyst. The various catalyst physical properties are summarized in Table XI, below.

TABLE XI

Physical Properties of the Catalysts at Various Cesium Loadings

| Presented in | wt. % Cs | S.A., m2/gram | P.V., cm3/gram | P.R., Angstroms | Coverage, Cs/nm2 |
|---|---|---|---|---|---|
| Table II | 13.2 | 58 | 0.46 | 111 | 10.31 |
| Table III | 9.17 | 92 | 0.57 | 93 | 4.52 |
| Table IV | 7.3 | 100 | 0.61 | 87 | 3.31 |
| Table VI | 5.53 | 117 | 0.55 | 78 | 2.14 |
| Table VII | 3.88 | 134 | 0.59 | 76 | 1.31 |
| Table VIII | 2.02 | 146 | 0.57 | 74 | 0.63 |
| Table IX | 1.2 | 149 | 0.58 | 74 | 0.36 |
| Table X | 0.83 | 149 | 0.58 | 75 | 0.25 |

S.A. = available surface area
P.V. = cumulative pore volume
P.R. = average pore radius Summarizing, the catalyst surface area (m²/gram) is seen to increase uniformly as the cesium loading is decreased from 13.2 to 1.2 wt.-% cesium, except for the 0.83 wt.-% Cs acid-washed catalyst discussed above in connection with Table X of EXAMPLE 1. The cumulative pore volume ranges from about 0.55 to about 0.61 cm³/gram for the 0.83 to 9.17 wt.-% Cs catalysts, respectively.

The 13.2 wt.-% Cs catalyst exhibited a cumulative pore volume of about 0.46 cm³/gram. The average pore radius ranges from about 74 and about 78 Angstroms for the 0.83 to 5.53 wt.-% Cs catalysts, respectively, and increases substantially uniformly from about 87 to about 111 Angstroms as the catalyst cesium loading is increased from 7.3 to 13.2 wt.-% Cs.

These results are significant in that they illustrate that the presence of alkali metal ions alters the structure of the silica gel. Too much structural alteration can occur at very high Cs loadings, resulting in very low surface areas and large pores. In the extreme case, this is undesirable because there would no longer be enough surface area to support the cesium, or for interaction with propionic acid, and catalyst activity would decrease.

EXAMPLE 3

Catalyst Performance Between De-cokings

Short-term and long-term MA-synthesis performance of the catalyst was tested in the minireactor at various cesium loadings. Representative data of those minireactor runs, presented below, are for cesium loadings of 3.75 wt.-% Cs (Table XII), 7.3 wt.-% Cs (Table XIII) and 9.2 wt.-% Cs (Table XV).

Catalyst performance was monitored by collecting a sample, for analytical purposes, at least once a day for each of the 3.75 wt.-% Cs, the 7.3 wt.-% Cs, and the 9.2 wt.-% Cs catalysts.

The 3.75 wt.-% Cs catalyst (Table XII) included about 410 p.p.m. of boron and was made in the same manner as the catalyst whose performance is reported in Table III, above. Table XII, below, presents data that illustrates MA-synthesis performance of this catalyst.

TABLE XII

Short-Term Performance of 3.75 wt. % Cs Catalyst

| Run No. | % PAC | % PAS | % PAY | T (°C.) | WHSV | % S A | % S B | Total Hours | Hours Since Decoking |
|---|---|---|---|---|---|---|---|---|---|
| 1 | 30.4 | 84 | 26 | 315 | 1.50 | 1.4 | 1.1 | 227.0 | 0.5 |
| 2 | 28.8 | 88 | 25 | 314 | 1.49 | 2.3 | 1.4 | 250.8 | 24.6 |
| 3 | 28.3 | 86 | 24 | 315 | 1.49 | 1.9 | 1.2 | 274.8 | 48.2 |
| 4 | 27.4 | 87 | 24 | 315 | 1.49 | 1.6 | 1.1 | 303.6 | 77.0 |
| 5 | 27.2 | 86 | 23 | 314 | 1.49 | 1.4 | 1.1 | 323.1 | 96.5 |
| 6 | 29.5 | 86 | 26 | 316 | 1.48 | 1.2 | 1.0 | 327.6 | 1.8 |
| 7 | 29.4 | 84 | 25 | 315 | 1.51 | 2.2 | 1.3 | 350.0 | 24.2 |
| 8 | 27.5 | 90 | 25 | 315 | 1.49 | 1.8 | 1.2 | 373.6 | 47.8 |
| 9 | 27.2 | 88 | 24 | 315 | 1.48 | 1.6 | 1.1 | 402.1 | 76.3 |
| 10 | 27.5 | 85 | 23 | 316 | 1.47 | 1.4 | 1.0 | 421.8 | 96.0 |

Average relative conversion loss in a typical 4-day cycle between de-cokings is seen to be about 7 to about 10%, i.e. the reduction from about 30% PAC (Run Nos. 1 and 6) to about 27% PAC (Run Nos. 5 and 9, respectively).

Table XIII, below, presents illustrative short-term performance of the 7.3 wt.-% Cs catalyst, while Table XV illustrates the short-term performance of the 9.17 wt.-% Cs catalyst. The preparations of the 7.3 wt.-% Cs catalyst (Table XIII) and of the 9.17 wt.-% Cs catalyst (Table XV) are discussed above in EXAMPLE 1.

Table XIV, below, presents illustrative short-term performance of a catalyst having a nominal cesium loading of about 7 wt.-% cesium, and containing no boron. This catalyst was prepared in the same manner as the catalysts whose performance is reported in Tables XIII and XV except that no boric acid was added.

TABLE XIII

Short-Term Performance of 7.3 wt. % Cs Catalyst

| Run No. | % PAC | % PAS | % PAY | T (°C.) | WHSV | % S A | % S B | Total Hours | Hours Since Decoking |
|---|---|---|---|---|---|---|---|---|---|
| 1 | 30.2 | 84 | 26 | 314 | 1.43 | 1.1 | 0.8 | 215.8 | 0.7 |
| 2 | 28.6 | 88 | 25 | 313 | 1.45 | 0.9 | 0.7 | 239.1 | 23.4 |
| 3 | 28.2 | 89 | 25 | 313 | 1.43 | 0.9 | 0.6 | 263.2 | 47.8 |
| 4 | 28.6 | 87 | 25 | 313 | 1.43 | 0.8 | 0.6 | 287.0 | 71.7 |
| 5 | 28.3 | 87 | 25 | 313 | 1.43 | 0.8 | 0.6 | 311.2 | 95.8 |
| 6 | 28.4 | 87 | 25 | 313 | 1.41 | 0.9 | 0.6 | 359.2 | 24.3 |

TABLE XIII-continued
Short-Term Performance
of 7.3 wt. % Cs Catalyst

| Run No. | % PAC | % PAS | % PAY | T (°C.) | WHSV | % S A | % S B | Total Hours | Hours Since Decoking |
|---|---|---|---|---|---|---|---|---|---|
| 7 | 28.9 | 84 | 24 | 313 | 1.42 | 0.8 | 0.6 | 383.2 | 48.2 |
| 8 | 28.3 | 86 | 24 | 313 | 1.42 | 0.8 | 0.6 | 407.0 | 72.0 |
| 9 | 28.7 | 84 | 24 | 313 | 1.41 | 0.7 | 0.6 | 431.4 | 96.4 |

TABLE XIV
Short-Term Performance
of 7 wt. % Cs Catalyst

| Run No. | % PAC | % PAS | % PAY | T (°C.) | WHSV | % S A | % S B | Total Hours | Hours Since Decoking |
|---|---|---|---|---|---|---|---|---|---|
| 1 | 29.7 | 83 | 25 | 314 | 1.43 | 0.8 | 0.7 | 117.5 | 0.7 |
| 2 | 28.7 | 86 | 25 | 313 | 1.42 | 0.7 | 0.6 | 140.8 | 23.9 |
| 3 | 26.9 | 93 | 25 | 313 | 1.42 | 0.7 | 0.5 | 165.2 | 48.4 |
| 4 | 27.8 | 87 | 24 | 313 | 1.43 | 0.6 | 0.5 | 212.9 | 96.1 |
| 5 | 28.0 | 89 | 25 | 314 | 1.42 | 0.8 | 0.7 | 237.0 | 0.2 |
| 6 | 27.0 | 92 | 25 | 314 | 1.40 | 0.7 | 0.5 | 261.1 | 24.2 |
| 7 | 27.4 | 89 | 24 | 314 | 1.42 | 0.6 | 0.5 | 284.9 | 48.1 |
| 8 | 27.4 | 88 | 24 | 314 | 1.44 | 0.6 | 0.5 | 308.9 | 72.1 |

TABLE XV
Short-Term Performance
of 9.17 wt. % Cs Catalyst

| Run No. | % PAC | % PAS | % PAY | T (°C.) | WHSV | % S A | % S B | Total Hours | Hours Since Decoking |
|---|---|---|---|---|---|---|---|---|---|
| 1 | 28.8 | 84 | 24 | 317 | 1.47 | 0.8 | 0.8 | 236.0 | 0.2 |
| 2 | 27.7 | 87 | 24 | 315 | 1.46 | 0.7 | 0.7 | 260.3 | 24.6 |
| 3 | 27.8 | 86 | 24 | 315 | 1.46 | 0.7 | 0.7 | 284.2 | 48.4 |
| 4 | 28.4 | 85 | 24 | 315 | 1.46 | 0.7 | 0.7 | 308.2 | 72.4 |
| 5 | 28.4 | 83 | 24 | 315 | 1.47 | 0.6 | 0.7 | 331.9 | 96.2 |
| 6 | 28.8 | 84 | 24 | 315 | 1.47 | 0.8 | 0.8 | 356.2 | 0.5 |
| 7 | 28.0 | 88 | 24 | 315 | 1.46 | 0.7 | 0.7 | 380.2 | 24.5 |
| 8 | 29.0 | 83 | 24 | 315 | 1.47 | 0.7 | 0.6 | 404.6 | 48.5 |
| 9 | 28.5 | 84 | 24 | 315 | 1.47 | 0.6 | 0.6 | 428.3 | 72.2 |
| 10 | 27.5 | 87 | 24 | 315 | 1.46 | 0.6 | 0.6 | 452.4 | 96.3 |

Summarizing, the average relative short-term conversion loss for each of the 7.3 wt.-% Cs (Table XIII), the 7 wt.-% Cs (Table XIV) and the 9.17 wt.-% Cs (Table XV) catalysts was typically less than about 6% per cycle.

A novel Cs-containing catalyst on a particulate silica gel support has been described herein. A method for the production of such catalysts has also been described. While the catalyst and the method for making the catalyst have been described with reference to preferred embodiments, the present invention is not to be limited to these embodiments. On the contrary, alternative methods of making the catalyst will become apparent to those skilled in the art upon reading the foregoing description. For example, while the above-described methods for making the catalyst illustrate the co-forming of the catalyst from (1) the SiO$_2$-based catalyst support and (2) the active cesium ion catalytic ingredient, the catalyst support can be formed first, and thereafter, cesium ions in the +1 oxidation state can be deposited onto the catalyst support surface. To that end, such a pre-formed catalyst support can be contacted with an effective amount of a cesium ion-containing substance so that cesium ions are not only deposited onto the catalyst support surface in the +1 oxidation state, but so that the cesium ions are present on the catalyst support in an amount of about 4 to about 10 percent by weight, based on the weight of the catalyst, as well. Still other variations within the spirit and scope of the present invention are possible and will readily present themselves to one skilled in the art.

I claim:

1. A particulate catalyst, suitable for production of methacrylic acid by condensation of propionic acid with formaldehyde, which catalyst comprises a catalyst support which consists essentially of porous silical gel; and cesium ions on the catalyst support surface;
   the catalyst support having a surface area of about 50 to about 150 m$^2$/gram, a porosity of less than about 1 cm$^3$/gram, and a pore-size distribution such that less than about 10 percent of the pores present in the catalyst have a pore diameter greater than about 750 Angstroms; and said cesium ions being present in an amount of about 4 to about 10 percent by weight, based on the weight of said catalyst.

2. The catalyst in accordance with claim 1 wherein the catalyst support surface area is about 55 to about 140 m$^2$/gram.

3. The catalyst in accordance with claim 1 wherein the porosity of the catalyst support is about 0.4 to about 0.6 cm$^3$/gram.

4. The catalyst in accordance with claim 1 wherein a majority of the pores present in the catalyst have a pore diameter of about 80 to about 300 Angstroms.

5. The catalyst in accordance with claim 1 wherein the cesium is present in an amount of about 7 to about 10 wt.-%, based on the weight of the catalyst.

6. The catalyst in accordance with claim 1 wherein said catalyst contains about 7 to about 10 percent cesium ions by weight of said catalyst, and wherein the catalyst support has a surface area of about 55 to about 140 $m^2$/gram, a porosity of about 0.4 to about 0.6 $cm^3$/gram, and a pore size distribution such that a majority of the pores present in the catalyst have a pore diameter of about 80 to about 300 Angstroms.

7. A method for making a cesiumcontaining catalyst, suitable for production of methacrylic acid by the vapor-phase condensation of propionic acid with formaldehyde, which comprises the steps of combining, with agitation, a silica sol having a silica particle diameter of about 50 to about 200 Angstroms, and a cesium compound, in relative amounts sufficient to produce a freely-flowing slurry having a $Cs/(SiO_2+Cs)$ weight ratio of about 0.04 to about 0.1;

solidifying the produced, freely-flowing slurry to a gel;

drying the obtained gel to a crushable solid state; and calcining the dried get for a time period sufficient to remove adsorbed moisture therefrom.

8. The method in accordance with claim 7 wherein said cesium compound is selected from the group consisting of cesium carbonate, cesium oxide, cesium hydroxide, cesium phosphate, cesium fluoride and cesium nitrate.

9. The method in accordance with claim wherein said cesium compound is cesium carbonate.

* * * * *

UNITED STATES PATENT OFFICE
CERTIFICATE OF CORRECTION

Patent No. 4,845,070                    Dated Jul. 4, 1989

Inventor(s) RUTH A. MONTAG and GARY P. HAGEN

It is certified that error appears in the above-identified patent and that said Letters Patent is hereby corrected as shown below:

Title page, after "Ruth A. Montag" add --Gary P. Hagen--.

Col. 2, line 18, "catalyst" should be --catalysts--.

Col. 2, line 19, "composition" should be --compositions--.

Col. 6, line 3, "Longterm" should be --Long-term--.

Col. 9, line 12, "Fa" should be --FA--.

Col. 14, line 31, "CS" should be --Cs--.

Col. 19, line 12, "cesiumcontaining" should be --cesium-containing--.

Col. 20, line 15, after "claim" add --7--.

Signed and Sealed this

Twenty-sixth Day of June, 1990

Attest:

HARRY F. MANBECK, JR.

*Attesting Officer*        Commissioner of Patents and Trademarks